United States Patent [19]

Kane

[11] 4,021,373
[45] May 3, 1977

[54] METHOD OF PREPARING A CATALYTIC STRUCTURE

[75] Inventor: Robert Harvey Kane, Ho-Ho-Kus, N.J.

[73] Assignee: The International Nickel Company, Inc., New York, N.Y.

[22] Filed: Sept. 12, 1975

[21] Appl. No.: 612,261

Related U.S. Application Data

[63] Continuation-in-part of Ser. No. 411,691, Nov. 12, 1973, Pat. No. 3,925,259.

[52] U.S. Cl. ............................ 252/470; 252/477 R
[51] Int. Cl.² .................... B01J 23/72; B01J 23/86
[58] Field of Search ....... 252/470; 29/182.1, 182.3, 29/196.3, 199; 75/208 R; 148/6.31; 204/37 R; 427/383 C, 431

[56] References Cited

UNITED STATES PATENTS

| | | | |
|---|---|---|---|
| 3,619,170 | 11/1971 | Fisher et al. ...................... | 29/182.1 |
| 3,773,894 | 11/1973 | Bernstein et al. .............. | 252/474 X |
| 3,876,456 | 4/1975 | Ford et al. ...................... | 423/213.2 |

FOREIGN PATENTS OR APPLICATIONS

| | | | |
|---|---|---|---|
| 492,318 | 4/1953 | Canada ............................ | 204/37 R |
| 45-13687 | 5/1970 | Japan ............................... | 204/37 R |

*Primary Examiner*—W. J. Shine
*Attorney, Agent, or Firm*—Miriam W. Leff; Ewan C. MacQueen

[57] ABSTRACT

A process for producing a catalyst structure comprised of nickel, chromium and copper and having a stratified surface material formed as a coherent layer on a substrate, said substrate being a nickel- and chromium-containing alloy, comprising: providing a copper-containing coating on the substrate, said substrate containing at least about 10 weight percent chromium; and heating said coated substrate in a protective atmosphere to a temperature of at least the melting point of copper to form a surface area material which is or is capable of being developed into a stratified surface material and a chromium-rich sublayer.

10 Claims, No Drawings

METHOD OF PREPARING A CATALYTIC STRUCTURE

This application is a continuation-in-part of U.S. Pat. application Ser. No. 411,691, filed Nov. 12, 1973, now U.S. Pat. No. 3,925,259.

BACKGROUND OF THE INVENTION

This invention relates to a catalytic structure and a process for producing such structure. More particularly, it relates to the production of a catalytically active structure which is especially suited for high temperature use in a gaseous stream. In a specific embodiment, the present invention is directed to the preparation of catalysts comprised of an alloy consisting essentially of Cr-Ni-Cu in a configuration which is highly effective for the purification of automobile exhaust and industrial waste gases.

It is well known that catalysts may be used in a variety of forms in a catalytic bed, and that the catalyst structural design plays a marked role in determining catalyst suitability for a particular process. The interrelationships of the catalyst composition, design and process conditions are highly complex and often difficult to isolate from each other. In many processes using fixed bed catalysts, where large volumes of gaseous or liquid streams are passed through the reactor, it is advantageous to have a high surface area of the catalyst exposed relative to the amount of catalyst so as to facilitate contact of the reactants at the surface. The availability of the catalyst surface is particularly important in certain gaseous reactions, such as the purification of automobile engine exhaust streams and nitric acid plant tail gas streams, where the gas may pass through or adjacent to the catalyst at a very high linear velocity. In such processes, conventional particulate catalysts, e.g., pellets, chips, cylinders, spheres, and the like, have the disadvantage that they contribute to backpressure build-up in the system. Also, the particulate catalysts are more subject to attrition than a catalyst in which the movement is more restricted. In such types of reactions a structural form which will permit free passage of the reacting gases relative to the surface exposed will greatly enhance the suitability of an active catalytic material. Typical of the high surface area — larger open area stationary catalyst structures are metal gauze, woven metal screens, expanded metal mesh, honeycomb, metal foam, and knitted metal mesh. These may be massive catalyst structures or the catalyst may be deposited on a support of suitable design. The supports which may be, for example, of metal, ceramic, or glass, may participate in the catalytic activity or may serve merely to present the catalyst in a suitable structural pattern U.S. Pat. No. 3,928,235 filed Nov. 12, 1973 describes catalysts which are useful for high temperature applications, particularly for the purification of automotive exhaust streams. These catalysts are comprised of alloys containing at least chromium and copper. The chromium-copper alloys are effective oxidation catalysts, e.g., for oxidizing CO to $CO_2$, and alloys of the chromium-nickel-copper are particularly suitable for the removal of oxides of nitrogen as well as carbon monoxide and hydrocarbons from such streams. While the catalysts disclosed exhibit excellent activity and selectivity for many reactions, they are expensive to fabricate into complex shapes by conventional hot and cold working techniques because of limited malleability at room temperature.

It is an object of the present invention to provide a catalyst in a form which is especially suited for reactions involving high velocity gas or liquid flow reactants.

Another object is to provide a catalyst of a structural design which has a high surface area and large open area relative to the amount of catalyst.

A further object is to provide a catalyst structure consisting of a coating of the catalytically active material on a pre-formed structure which is stable at high temperatures.

A still further object is to provide a catalyst structure comprising an alloy consisting essentially of chromium, nickel and copper, the catalyst being developed on a pre-formed metal mesh substrate, which is made of a nickel and chromium-containing alloy.

The objects and advantages will become apparent from the following description.

In accordance with U.S. Pat. No. 3,295,259, a coherent catalyst comprising an alloy of chromium and copper is provided in a suitable structural form for permitting high rates of mass transfer and low resistance to flow by means of liquid-phase sintering of the alloy prepared as a pre-alloyed powder. In a preferred embodiment, the catalyst or precursor alloy thereof is provided as a coherent adherent coating of a nickel, chromium and copper on a substrate of suitable design. The present application concerns a further method of fabricating supported catalytic structures.

THE INVENTION

In accordance with the invention a composite catalytic structure comprised of nickel, copper and chromium and having a stratified catalytic surface material developed as a coherent adherent layer on a substrate, said substrate being a nickel- and chromium-containing alloy, is formed by a method comprising: providing a copper-containing coating on the substrate, said substrate alloy containing at least about 10 weight % chromium, and heating said coated substrate in a protective atmosphere to a temperature of at least the melting point of copper to form a surface area material which is or is capable of being developed into a stratified surface material and a chromium-rich sublayer.

Preferably, the surface layer is developed to contain a nickel-copper alloy of predetermined composition and the maximum temperature employed is the freezing point of such nickel-copper alloy.

By "protective atmosphere" is meant an atmosphere which is non-oxidizing or preferably reducing with respect to the substrate and coating. For example, the atmosphere may be an inert gas such as argon or helium, or preferably it is a reducing atmosphere such as dry hydrogen or an inert gas containing, e.g. about 5% hydrogen.

The surface area material formed in a protective atmosphere may already be stratified. However, on being treated in an atmosphere which is oxygenating with respect thereto, the surface area material will develop into stratified oxide layers and an oxidized chromium-rich sublayer. The oxidized chromium-rich sublayer consists essentially of at least one chromium-containing oxide, e.g. $Cr_2O_3$ and/or a mixture of chromium-containing oxides which may include nickel-chromium-oxides and/or copper-chromium-oxides, depending on the alloy composition and treatment.

Any method may be used to apply the coating material to the substrate. For example, one or more layers of copper or copper alloys and/or other desired elements may be deposited as a film, e.g. by electrolytic or non-electrolytic plating, vapor deposition, thermal or chemical decomposition of an inorganic or organic compound dissolved or suspended in a liquid medium, as a paint, e.g. by deposition from a colloidal silica-containing solution, or as a dry powder. In the embodiments using powders, e.g. dry or slurried in a liquid medium, mixtures of elemental powder and/or alloys thereof may be employed.

As indicated, the coating composition may contain one or more components. However, an essential component is copper. Nickel, chromium and any other elements desired in the coating may be present. But, the deposited coating must be deficient in nickel relative to the ultimate copper-nickel surface alloy desired. In preferred embodiments the coating is substantially only copper or predominantly copper.

In one embodiment, a copper-containing powder is deposited on a substrate of a desired shape with the aid of a fugitive binder. The binder is applied, e.g., by spraying, painting, dipping or the like, on a metal preform, and pre-alloyed powder is applied to the coated substrate. The substrate with the alloy powder thereon is then heated in an atmosphere containing low effective oxygen potentials to drive off the binder and permit dissolution of nickel into the copper layer. The initial temperature to which the coated structure is raised is at least the melting point of copper or slightly in excess thereof, and in a preferred temperature profile for treating a powder deposit, the temperature of the coating (or coated material) is raised slowly to about 650° C, and then rapidly to about the melting point of copper. Thereafter, the temperature is raised slowly to the freezing point of the desired nickel-copper alloy in the surface material. As will be explained further below the temperature at which the composition is heat treated plays a role in the composition and structure of the surface material.

Depending on the particular application, the substrate must satisfy certain requirements of mechanical strength and resistance to the environment. Preferably, it will be readily formable into the desired shape. In addition, the substrate contributes to the final surface composition and stratified structure. Because the support, as well as the coating, will contribute to the final surface layer composition and thickness, there must be sufficient concentration of one of the desired alloying elements present in the support to form the ultimate surface layer quickly and without excess dilution of the layer with other components of the support.

The substrates according to this invention are made of nickel- and chromium-containing alloys. The alloy provides at least a part of the nickel to form the active layer with the applied copper, and chromium serves several functions. First, it provides mechanical strength and oxidation resistance at elevated temperature; second, it can be a minor component of the catalyst alloy layer; third, when nickel diffuses outward to form the active layer, the sublayer is enriched in chromium because chromium will not readily alloy with the initially copper-rich surface layer — this enriched layer, when oxidized, can form a chromium-oxide-containing subscale to enhance catalyst durability. Iron may also be present in the support alloy as well, but it must be cautioned that iron does not dissolve as readily in copper as nickel and the iron present must not diminish the nickel concentration so as to inhibit the depletion of the non-chromium portion of the alloy thereby preventing the formation of the required chromium-rich sublayer. Likewise, such metals as molybdenum, niobium and tungsten may also be present.

If homogeneous structures are to be produced, advantageously, only the elements to be present in the coating — less the coating element(s) — are incorporated in the substrate, and these are present in a suitable ratio.

In general, the nickel-chromium-containing alloys of the substrate should contain from at least about 10% to about 50% chromium. (All percentage compositions herein are on a weight basis.) The nickel content should be at least that sufficient to provide the nickel needed to furnish the desired nickel-copper composition in the surface layer and to deplete the nickel content with respect to chromium so that a suitable chromium-rich layer will form, but without depleting the nickel content of the substrate undesirably. It will be appreciated that this is a function of the thickness of the coating and substrate as well as the composition of both.

Exemplary alloys for the substrate are nickel-chromium, nickel-chromium-copper and nickel-chromium-iron alloys consisting essentially of, by weight about 10% to about 50% to about 80% nickel, e.g., 80Ni-20Cr, 70Ni-30Cr, 50Ni-50Cr, 62Ni-28Cr-10Fe. There are many commercially available alloys which are satisfactory for this purpose. For example, Inconel alloys 600, 601, 671, & 690, and Incoloy alloy 800, are among the Ni-Cr alloys suitable. (These alloys are products of The International Nickel Company, Inc. New York, N.Y.) Tophet A and Tophet 30 (Ni-Cr alloys, products of Wilber B. Driver Co., Newark, N.J.) are also suitable. It will be noted that these suitable alloys contain minor amounts of elements in addition to the nickel and chromium without harmful effects. Composition selection will depend at least in part on the final composition desired and the coating deposited in addition to the physical and chemical requirements of the final substrate.

The thickness of the coating depends in part on the composition of the coating applied. It will be noted that thickness can be easily controlled with certain coating techniques. For example, in electrodeposition, the thickness of the coating is readily adjusted to form films of, e.g., from about ½ to about 5 mils thickness. In general, stratified surface areas including the chromium-rich layer which have a thickness of 0.3 to 5 mils are satisfactory. If the surface area material developed in the heat treatment in a protective atmosphere is too thick, upon oxidation the partial pressure of oxygen at the chromium-enriched sublayer may be too small to form the desired chromium-containing-oxide layer, and nitridation of the unprotected support and failure, will result. If copper is applied too thickly and liquid-phase treated then the diffusion zone becomes too broad and chromium enrichment in the sublayer will be diffuse, with a reduced possibility of forming the chromium-containing oxide layer. If the initial copper layer is too thin, then only a small amount of nickel diffusion from the support need occur to satisfy the desired final compositional requirement. The small amount of chromium enrichment will occur may be smoothed out quickly by solid state diffusion and thus will be lost. In general, this last restriction on the thickness is removed if the substrate size is of the order of the coating thickness. If a homogeneous structure is desired, coating thickness is fixed by a materials balance at a given substrate composition and thickness.

The composition of the surface area material is, ideally, determined by the treatment temperature, which exceeds the melting point of the lowest melting coating component, and the final composition of the surface will be that having the treatment temperature as a solidus. In practice, this may not occur, especially if the coating is thick, because diffusion in the liquid layer may not be sufficient to maintain a uniform composition.

In thicker coatings, the nickel concentration will normally not be uniform initially; however, the composites are to be treated in oxidizing atmospheres to form the active, stratified oxide layers, and such initial coating inhomogenity will enhance the formation of the desired surface structure. This desired structure is a laer of CuO above a mixed CuO-NiO layer, all separated from the support by a subscale of chromium oxides. In instances where a uniform, homogeneous coating is desired, further heat treatment in the solid state can be used.

The formation of the sublayers of chromium oxide(s) will depend, as indicated above, on substrate and coating compositions, coating thickness, and treatment period and temperature.

It was noted above that in heat treating the coating, preferably the temperature is raised relatively rapidly to at least the melting point of copper, i.e. about 1083° C, apart from consideration of the evolution of volatile materials, e.g., in the binder used for powder coatings. Thereafter, i.e. above 1083° C, the rate of temperature rise to the desired maximum is minimized, or the liquid layer may draw together by capillarity. The temperature rise above the melting point of copper is regulated to achieve a more uniformly planar surface area material, to control the shape of the interface, and to minimize surface tension effects. Rates of temperature increase at above 1083° C are suitably about 5° to 100° C/min. For processing powder which is deposited with a binder, below about 650° C, the rate of temperature increase is slow, e.g., suitably less than about 150° C to about 300° C/minute, to permit the volatile agents to escape without disturbing the coating. Suitably, the heat treatment is held for a period of about 10 and 120 seconds at about maximum temperature. If homogeneous structures are desired the treatment periods are adjusted accordingly. In thin sections, of course, homogeneity is achieved more readily.

Some precautions must be observed, however, in processing the materials. For example, the treatment temperature must be above the melting temperature of the lowest melting coating component, but limits can be present on the maximum allowable temperature. In making homogeneous materials by reaction of the liquid layer with the solid support the treatment temperature must not exceed the solidus of the ultimate homogeneous alloy to be formed or general melting occurs. By way of illustration, a sample of 5 × 7 mil Ni-20Cr expanded metal coated with ½ mil of electrodeposited copper and exposed to a temperature of about 1204° C (2200° F), melted.

As described in the aforementioned U.S. Pat. No. 3,928,235 to develop a durable, active, stratified catalytic surface, the precursor alloy, preferably in the form of a shaped material, is heated in an atmosphere which is oxygenating with respect to the alloy. Suitably the atmosphere contains free oxygen, for example, the atmosphere may be air, air containing up to about 10 percent moisture, or a nitrogen stream containing oxygen. However, it has been found that the active catalyst may be developed in-situ, e.g., in the exhaust stream itself where the NO, $CO_2$ or $H_2O$ may supply the oxygen needed to form the combination of oxides and/or metal at the surface of the alloy which is active and resistant to further oxidation. Thus, although stoichiometrically reducing in respect to the CO, the stream may be oxidizing with respect to constituents of the precursor alloys. The temperature for developing the catalytic surface may range from about 1,100° to about 1,900° F. For preliminary oxidation alloys may suitable be treated in air at a temperature in the range of about 1,500° to 1,700° F for a period of about 2 to 30 hours.

It will be noted that in the embodiment in which the coating is applied as a metal powder, additional agents may be used to effect a suitable coating. For example, graphite, e.g. as micron-sized particles dispersed in a volatile hydrocarbon, or a polymeric material, e.g. an acrylic lacquer, may be sprayed on the powder metal coating. This will serve to hold the powder in place during development on the substrate.

The following examples are intended to illustrate the process of the present invention, but it is not intended that this invention be limited to the specific embodiments shown therein.

EXAMPLE I

A sample of 30 mil thick foil of INCONEL alloy 671, containing approximately 48% chromium, was coated with Krylon spray (a rubber cement product of the Borden Co.) and dipped in copper powder to form a layer about 1 mil thick. The composite was sintered in argon for 1 minute at 1149° C (2100° F). Microexamination showed a surface layer composed of a copper-rich matrix and a dispersion of a chromium-containing second phase. A second sample prepared by heating in argon quickly to 1093° C (2000° F), and then holding for 2 minutes in air at 815° C (1500° F). The surface was found to be CuO with a sublayer of NiO and CuO, and a chromite and a continuous, protective $Cr_2O_3$ sublayer formed below the copper and nickel oxide layer. This is a desirable microstructure for durable, active $NO_x$ reduction catalysts.

EXAMPLE II

Samples of 80Ni-20Cr alloy in the form of expanded metal mesh made from 5 mil foil were sprayed with Krylon and dipped in copper powder, −200 mesh. Samples were treated in dry argon; sample 1 was slowly heated to 1121° C (2050° F), sample 2 was heated slowly to 1193° C (2180° F) and held for 3 minutes. Both samples were examined by electron microbeam probe and were tested for $NO_x$ reduction activity. Sample 1 had a diffusion zone about 50 microns thick, consisting of about 75% copper, 22% nickel, and 1.3% chromium. Below the reacted layer chromium enrichment was detected by microanalysis and metallography. Sample 2 showed a broader diffusion zone and a continuously decreasing copper content from surface to inside, and a greater nickel content in the diffusion zone, about 25 to 32%. Chromium enrichment was also detected, the subsurface layer containing up to 31% chromium. Both samples were tested for catalytic activity without surface oxidation. During testing in synthetic exhaust of variable $O_2$ content, catalytic activity developed quickly in both materials. Characteristic of higher nickel $NO_x$ catalyst alloys, sample 2 became active sooner and had less $NH_3$ formation tendencies. The activity of both samples was judged very good.

EXAMPLE III

Samples of 80–20 nickel-chromium expanded metal mesh, having a web cross section of 5 by 7 mils, were electroplated with copper 0.0005 inch thick, with the objective of forming a homogeneous alloy comprised of Ni-27Cu-15Cr. A sample was heated to 1093° C (2000° F) and the temperature was raised to 1121° C (2050° F) over 6 minutes. A further rise to 1149° C (2100° F) over 2 minutes, then to 1177° C (2150° F) over 2 minutes, and a hold at 1177° C (2150° F) for 15 minutes resulted in formation of a nearly homogeneous, single phase material, with a white metallic surface coloring. While an etched microsection showed some evidence of copper enrichment at the surface, it was minor. Some additional time at temperature would have essentially homogenized the sample. As shown in the aforementioned U.S. patents, a stratified surface layer will develop in this alloy upon oxidation treatment.

Accordingly, the process of the present invention enables for relatively simple fabrication of catalysts suitable for $NO_x$ reduction. It will be obvious that the final composition can be adjusted by adding nickel or chromium as electroplated layers onto commercially available alloys such as those mentioned above. Thus, the substrate need not be specially made to meet end composition requirements.

For convenience, and not for the purpose of limitation, the catalyst of the present invention has been described mainly with respect to the treatment of automobile exhaust to remove nitrogen oxides. The catalysts are also useful, for example, as oxidation catalysts, e.g. for oxidation of hydrocarbons and carbon monoxide in the presence of, e.g., air and/or $H_2O$. This will include such reactions as steam reforming and water-gas shift. They are also catalytic for the formation of ammonia in the absence of air.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. A process for producing a catalyst structure comprised of nickel, chromium and copper and having a stratified surface material formed as a coherent layer on a substrate, said substrate being a nickel- and chromium-containing alloy, comprising: providing a copper-containing coating on a substrate, said substrate containing at least about 10 weight percent chromium and said coating being deficient in nickel relative to the substrate; and heating said coated substrate in a protective atmosphere to a temperature of at least the melting point of copper to develop a surface area material which is or is capable of being developed into a stratified surface material and a chromium-rich sublayer.

2. A process as described in claim 1 wherein the protective atmosphere is selected from at least one member of the group consisting of inert gases and dry hydrogen.

3. A process as described in claim 1 wherein a nickel-copper alloy of predetermined composition is formed in the surface area material and the maximum temperature of the heat treatment is the freezing point of such nickel-copper alloy.

4. A process as described in claim 1 wherein the developed surface area material has a predetermined nickel-copper composition and wherein the copper-containing coating has a composition which is selected from at least one member of the group consisting of elemental copper, and an alloy consisting essentially of nickel and copper, said alloy being nickel deficient relative to the predetermined composition.

5. A process as described in claim 1 wherein the substrate is a nickel-chromium alloy comprised by weight, of about 10 to about 50% chromium and about 50 to about 80% nickel.

6. A process as described in claim 1 wherein the heat treatment is effected in the range of from about 1083° C to about the solidus temperature of the developed surface area material.

7. A process as described in claim 6 wherein heating is effected rapidly to a temperature of about 1083° C and thereafter heating to the maximum temperature is effected at a rate sufficiently slow to minimize surface tension effects and to produce a more uniformly planar surface area material.

8. A process as described in claim 1 wherein after the heat treatment in the protective atmosphere, the resultant material is treated in an atmosphere which is oxygenating with respect to the resultant surface area material to develop stratified oxide layers and a chromium-oxide containing sublayer.

9. A process as described in claim 1 wherein the substrate is an open metal mesh in a configuration selected from expanded metal mesh, woven wire mesh, knitted metal mesh, gauze, honeycomb, and metal foam.

10. A process as described in claim 1 wherein the developed stratified surface material and chromium-rich layer has a total thickness of about 0.3 to about 5 mils.

* * * * *